United States Patent Office 3,008,832
Patented Nov. 14, 1961

3,008,832
STABILIZED SEASONING COMPOSITION AND
METHOD OF MAKING THE SAME
Henry J. Gorsica, Northbrook, Ill., assignor to
B. Heller & Company
No Drawing. Filed Sept. 24, 1959, Ser. No. 841,950
10 Claims. (Cl. 99—140)

This invention relates to seasoning materials and particularly, to the preparation of an improved dry seasoning for food products such as cured meat products, pickled vegetables, cooked meat, ground meats used in the preparation of sausages, hamburger, canned proteinaceous meaty materials and other meat containing products. Still more particularly it relates to soluble spice flavorings which are storage stable products.

It is common practice to employ liquid seasoning principles such as essential flavoring oils (volatile oils), essences, nonvolatile or waste oils, for example, oleo-resins contained in the flavor of spices, various extracts as in red pepper and other derived products from natural spices and flavoring materials in preparing a seasoning. It is essential that such prepared seasoning be produced in uniform strength, flavor, aroma, color, etc.

In most instances it is desirable that the flavoring preparation be mixed with a dry carrier or vehicle which appropriately dilutes the flavoring agents for use and provide bulk to facilitate uniform blending of the ingredients.

The use of dry, water-soluble carriers has presented certain difficulties which detract in various ways from the advantages which would otherwise result from the appropriate blending of the flavoring ingredients with said carrier. For example, spiced flavoring which has as the base or carrier, sugar, dextrose, salt or mixtures thereof are completely soluble but exhibit a tendency to cake and to harden. Furthermore, the flavoring materials adhering to the surface of the soluble base granules are susceptible to oxidation, deterioration and decomposition during shelf storage or when mixed with food products.

In an attempt to overcome the tendency toward caking and hardening of the soluble spice flavorings anti-caking agents have been incorporated in the mixture. The anti-caking agents most frequently used for this purpose are calcium carbonate, magnesium stearate, calcium stearate, tricalcium phosphate, calcium silicate, and the like. While these added materials are effective in varying degrees in eliminating the caking problem, the flavoring containing such agents are no longer completely soluble because of the limited solubility of the agents in aqueous solutions.

This insolubility of the anti-caking agents limits the uses for the flavoring containing such materials. Spice flavorings with insoluble materials, for example, cannot be used to prepare a solution for use in pumping hams. For this purpose it is imperative that the curing solution or so-called "pumping pickle," be completely free of insoluble matter since solid particles might clog the arteries and prevent effective pumping of the ham. Use as a pumping pickle is an important use for seasoning and elimination of this outlet is a serious economic handicap.

Another disadvantage of the soluble seasonings containing coloring matter such as the oleo-resin of capsicum or oleo-resin of paprika has been the change in color or even loss of color. The named coloring oleo-resins impart a rich red color to a seasoning but unless this color is protected against the effects of light and oxygen, the color fades to orange or yellow and the fading is accompanied by the development of a very objectionable rancid odor. These changes in color adversely affect consumer acceptance of the product.

In an effort to stabilize seasonings, some oil soluble antioxidants such as butylated hydroxy-anisole or butylated hydroxy toluene have been used. These agents have been partially effective in preventing the fading of some oleo-resin coloring matter such as that from paprika but are not effective in preventing caking or hardening.

It has now been discovered that soluble seasoning of improved stability combining flavoring, aroma and color values of the essence or soluble seasonings with a soluble carrier can be stabilized against caking and loss of color by admixing with said ingredients a relatively small amount of tetra-sodium pyrophosphate which is a completely water-soluble stabilizer.

Stabilizing of the seasoning against caking, loss of color and development of rancidity is specific to the quaternary sodium salt of pyrophosphoric acid. Various salts of orthophosphoric acid such as tri-sodium phosphate, disodium phosphate, dicalcium phosphate and other phosphate salts such as sodium hexametaphosphate, sodium tripolyphosphate, potassium-octametaphosphate, sodium acid pyrophosphate have been found ineffective for this purpose.

While all of the quaternary alkali metal salts of pyrophosphoric acid are water-soluble, only the sodium and potassium salts may be incorporated in foods for human consumption. Quaternary potassium salt of pyrophosphoric acid is deliquescent and therefore can only be utilized as a stabilizer for soluble seasoning under special packaging arrangements.

Tetra-sodium pyrophosphate is the preferable salt and is utilized in amounts preferably between 1% and 2% by weight of the mixture since at this pyrophosphate salt level, a soluble seasoning will be stabilized against caking and fading for a period of 12 to 16 months. Larger amounts of this salt, i.e., up to 4%, while useful, have not shown economically justifiable improvements. Small amounts of tetra-sodium pyrophosphate of the order of 0.5% are effective in the absence of oil solutions of certain antioxidants. In the presence of such oil solutions of antioxidants, some caking does occur when utilizing smaller amounts of tetra-sodium pyrophosphate but this adhering together of particles is of a nature readily broken down in handling or packaging of the products and does not require crushing or grinding action to reduce the material to a free flowing powder.

In the preparation of the seasoning material, the oleo-resins, essential oils and essences of desired varieties and in desired proportions, together with the stabilizer tetra-sodium pyrophosphate in suitable amounts are added to a relatively large amount of particulate, i.e., powdered or granular, soluble carrier such as sugar having a predetermined size, for example, passing through a 40 mesh screen and retained on a 60 mesh U.S. Standard screen. The ingredients are mixed, for example, in a blender equipped with a helical stirrer until a uniform color is developed. Such blending in most instances will produce a uniform product in from 5 to 10 minutes. If the particle size of one or more of the ingredients is of a larger mesh size than desired in the final product, the blending can be accomplished in the course of grinding or size reduction.

The oleo-resin and essential oils may be admixed in varying proportions depending upon the seasoning desired. In general, the soluble carrier will constitute 85% to 95% of the mixture. The flavoring extracts and the stabilizer agent may be admixed prior to being mixed with the carrier or may be added individually for admixing with carrier and other components of the seasoning.

Tetra-sodium pyrophosphate is compatible with and may be used in conjunction with oil soluble antioxidants such as butylated hydroxy anisole or butylated hydroxy toluene individually or collectively. Addition of a vegetable oil solution of a mixture of the above mentioned antioxidants having an antioxidant concentration of 40%, in an amount of 0.5% by weight of the mixture to a seasoning mixture containing tetra-sodium pyrophosphate provides a seasoning which will not fade in color over a period of 18 to 24 months. Amounts of solution of antioxidants in the range of 0.1% to 0.3% give almost as complete protection against fading as is attained with the larger amount of antioxidant. Upon reduction of the amount of solution of antioxidant to about 0.05%, a fading of the color of the seasoning containing the oleo-resin of paprika, the least stable of the red colors, is discernible after about 18 months but the extent of fading is insufficient to affect consumer acceptance of the product. The amount of antioxidant added under these conditions is in the range of from 0.02% to 0.2% by weight.

The value of the invention may be further understood with reference to the illustrative embodiments thereof described below, it being understood that the detailed description is given by way of explanation and illustration, and not by way of limitation, since various changes may be made without departing from the spirit and scope of the invention. In the examples, all components are given in parts by weight.

Example I

A soluble frankfurter seasoning was prepared as follows: 90 parts of salt and 10 parts of powdered dextrose were uniformly mixed at room temperature. To the salt-dextrose mixture was added the following solution or dispersion of 0.6 part oleo-resin of capsicum
0.5 part oleo-resin of black pepper
0.2 part of oil of coriander After thoroughly mixing the ingredients, the mixture was dry to the touch. Portions of this mixture was placed in 6 oz. bottles of the type used in the sale of seasoning, which bottles are equipped with a screw on cover. The bottles were then placed in an exposed position where the contents of the bottles were subject to direct sunlight.

This frankfurter seasoning when freshly prepared was a bright red color. Following three months of exposure this seasoning had lost about ½ of its red color and in 6 months was a greenish-yellow. In the same period the seasoning had caked and crystallized into a hard brittle mass.

Example II

To a portion of the composition of Example I remaining in the mixer after withdrawal of test samples was added 2 parts of tricalcium phosphate. After thoroughly mixing the ingredients this mixture was bottled and set out for exposure tests. At the end of the 6 months' period, the frankfurter seasoning had deteriorated in color to a comparable greenish-yellow of the product of Example I. The seasoning had caked and crystallized into a mass having the physical characteristics only slightly less adherent than the product found in Example I.

Example III 100 parts of granulated salt of a size passing through a 40 mesh screen was mixed with 1 part of oleo-resin of paprika and 2 parts of tetra-sodium pyrophosphate. After mixing the ingredients to a substantially uniform red color, the material was packaged in 6 oz. bottles with screw on cap. This material, like the materials in Examples I and II, was stored where the material was subjected to direct sunlight. After subjecting the sample to the sunlight test for a period of 16 months, it was determined that there was no caking and that the product remained a free flowing granular material. In this 16 month period, comparison of the product with a sample of the same material which was maintained as a control and in a storage place where the product was not exposed to light, showed that there was some slight change in the depth of redness of color.

Example IV 100 parts of granulated salt, of the grade sold as extra refined, was uniformly mixed at room temperature with 2 parts of tetra-sodium pyrophosphate, 1 part of the oleo-resin of capsicum and 0.05 part of oil solution of butylated hydroxy anisole and butylated hydroxy toluene. This seasoning mixture after exposure to sunlight for 16 months in 6 oz. bottles of the same type used for the testing of the products of Examples I, II and III showed negligible fading of color, no sign of caking and no evidence of rancidity.

Example V

A soluble frankfurter seasoning similar to that of Example I was prepared as follows:

90 parts of salt, extra refined grade
10 parts of powdered dextrose
2 parts of powdered tetra-sodium pyrophosphate were uniformly mixed at room temperature.

To this powdered mixture was added the following solution or dispersion of 0.6 part oleo-resin of capsicum
0.5 part oleo-resin of black pepper
0.2 part of oil of coriander
0.08 part of oil solution of butylated hydroxy anisole and butylated hydroxy toluene (40% concentration)

After thoroughly mixing the ingredients, the mixture was dry to the touch. Portions of this mixture were placed in 6 oz. bottles of the type having a screw on cover. The bottles were then placed in exposed position where the contents of the bottles were subject to direct sunlight.

This frankfurter seasoning when freshly prepared was a bright red color substantially identical with that of the freshly prepared seasoning of Example I. Following 18 months of exposure to sunlight this seasoning mixture showed negligible fading of color, no sign of caking and no evidence of rancidity.

The selection and proportions of the essential oils of other seasoning concentrates depends upon the particular flavor desired. Such additional concentrates may be employed as for example, from paprika, pimento, cassia, cinnamon, clove, mace, sage, thyme, marjoram, anise, bay, coriander, nutmeg, sweet basil, cardamom, celery, onion, garlic, cumin, fennel, black pepper, tarragon, mustard, walnut, vanilla, and lemon. Some of these concentrates are known as oleo-resin such as oleo-resin of paprika. Others are known as oils such as oil of thyme or oil of mustard.

The terms "essential oil" and "oleo-resins" are intended to embrace liquid seasoning principles in concentrated form.

The percentage of vegetable oil solution of antioxidants set forth are based upon antioxidants constituting 40% of the added solution. If the concentration of antioxidant is greater or less than shown, then it is to be understood that the amounts of solution added will have to be varied to incorporate equivalent amounts of antioxidant.

Obviously the invention is not limited to the details of the illustrative embodiments thereof herein described, since they may be variously modified. Moreover, it is not indispensable that all features of the invention be used conjointly since various features may be embodied in different combinations and subcombinations.

I claim:

1. A stable soluble seasoning comprising in combination a dry, particulate water-soluble carrier, liquid seasoning principles adsorbed on the surface of said particulate carrier and a minor amount of pulverulent tetra-sodium pyrophosphate admixed therewith.

2. A seasoning as claimed in claim 1 wherein the tetra-sodium pyrophosphate is present in an amount of from 0.5% to 4% by weight of the mixture.

3. A seasoning as claimed in claim 2 wherein the tetra-sodium pyrophosphate is preesnt in an amount of from 1% to 2%.

4. A soluble seasoning stabilized against caking, loss of color and oxidative deterioration comprising in combination a dry particulate water-soluble carrier, essential oil, and oleo-resin derived from flavoring materials, said essential oil and oleo-resin being adsorbed on the surface of said particulate carrier, and a minor quantity of pulverulent tetra-sodium pyrophosphate admixed therewith.

5. A stable soluble seasoning comprising in combination a dry particulate water-soluble carrier selected from the group consisting of sugar, dextrose, salt and mixtures thereof, liquid seasoning principles adsorbed on the surface of said particulate carrier and a minor amount of pulverulent tetra-sodium pyrophosphate admixed therewith.

6. A stable soluble seasoning comprising in combination a dry particulate water-soluble carrier, liquid seasoning principles adsorbed on the surface of said particulate carrier and admixed therewith minor quantities of pulverulent tetra-sodium pyrophosphate and oil soluble edible antioxidant.

7. A seasoning as claimed in claim 6 wherein the antioxidant is present in an amount of from 0.02% to 0.2% by weight of the mixture, said antioxidant being selected from the group consisting of butylated hydroxy anisole, butylated hydroxy toluene and mixtures thereof.

8. A method of preventing caking, loss of color and oxidative deterioration of soluble seasoning which consists of incorporating into a mixture comprising particulate water-soluble carrier and liquid seasoning principles adsorbed on the surface of the carrier particles, a minor quantity of powdered tetra-sodium pyrophosphate.

9. A method according to claim 8 in which the quantity of powdered tetra-sodium pyrophosphate is between 0.5% and 4% by weight of the mixture.

10. A method of preventing cake, loss of color and oxidative deterioration of soluble seasoning which consists of incorporating into the mixture comprising pulverulent water soluble carrier and liquid seasoning principles adsorbed on the surface of the carrier particles, a minor quantity of powdered tetra-sodium pyrophosphate and an amount of from 0.02% to 0.2% by weight of the mixture of oil soluble edible antioxidant.

References Cited in the file of this patent

UNITED STATES PATENTS

| | | |
|---|---|---|
| 2,032,612 | Griffith et al. | Mar. 3, 1936 |
| 2,365,438 | Schilb | Dec. 19, 1944 |

OTHER REFERENCES

"A New Lard Antioxidant," Food Manufacture, October 1954, page 398.